US009404479B2

(12) United States Patent
Quek (10) Patent No.: US 9,404,479 B2
(45) Date of Patent: Aug. 2, 2016

(54) SYSTEMS, DEVICES AND METHODS FOR IMPROVING EFFICIENCY OF WIND POWER GENERATION SYSTEMS

(75) Inventor: Shu Ching Quek, Somerville, MA (US)

(73) Assignee: Tufts University, Medford, MA (US)

( * ) Notice: Subject to any disclaimer, the term of this patent is extended or adjusted under 35 U.S.C. 154(b) by 133 days.

(21) Appl. No.: 14/006,869

(22) PCT Filed: Mar. 22, 2012

(86) PCT No.: PCT/US2012/030180
§ 371 (c)(1),
(2), (4) Date: Mar. 3, 2014

(87) PCT Pub. No.: WO2012/129435
PCT Pub. Date: Sep. 27, 2012

(65) Prior Publication Data
US 2014/0167419 A1     Jun. 19, 2014

Related U.S. Application Data

(60) Provisional application No. 61/466,442, filed on Mar. 22, 2011.

(51) Int. Cl.
*F03D 7/04* (2006.01)
*F03D 1/06* (2006.01)
(Continued)

(52) U.S. Cl.
CPC ...... *F03D 7/048* (2013.01); *F03D 1/06* (2013.01); *F03D 7/0224* (2013.01); *F03D 11/00* (2013.01); *F05B 2240/13* (2013.01); *F05B 2240/14* (2013.01); *F05B 2240/96* (2013.01); *Y02B 10/30* (2013.01); *Y02E 10/721* (2013.01); *Y02E 10/722* (2013.01); *Y02E 10/726* (2013.01)

(58) Field of Classification Search
USPC ....................................... 290/44, 55
See application file for complete search history.

(56) References Cited

U.S. PATENT DOCUMENTS

| 4,370,095 A | 1/1983 | Sleeper |
| 5,876,181 A | 3/1999 | Shin |
| 7,870,783 B2 * | 1/2011 | Yoshida ............... G01P 5/06 290/44 |

(Continued)

FOREIGN PATENT DOCUMENTS

| DE | 10 2009 022 537 A1 | 12/2010 |
| DE | 10 2009 038 076 A1 | 2/2011 |

(Continued)

OTHER PUBLICATIONS

Extended European Search Report mailed Aug. 5, 2014 for Application No. EP 12760352.0.

(Continued)

*Primary Examiner* — Tho D Ta
(74) *Attorney, Agent, or Firm* — Wolf, Greenfield & Sacks, P.C.

(57) ABSTRACT

According to some aspects of the invention, a turbine, such as a wind turbine, is provided that includes one or more fluid (e.g., air) flow components for inducing a secondary fluid flow that emanates from a rearward location on the turbine to minimize wake effects. According to some aspects of the invention, arrays of turbines, such as in wind farms, are provided that comprise a plurality such turbines. According to further aspects of the invention, methods are provided for minimizing wake effects in a wind turbine and for improving the efficiency of a wind farms.

20 Claims, 7 Drawing Sheets

(51) Int. Cl.
*F03D 11/00* (2006.01)
*F03D 7/02* (2006.01)

(56) References Cited

U.S. PATENT DOCUMENTS

| | | |
|---|---|---|
| 2008/0232957 A1 | 9/2008 | Presz et al. |
| 2009/0099702 A1 | 4/2009 | Vyas et al. |
| 2009/0295164 A1 | 12/2009 | Grabau et al. |
| 2010/0140952 A1 | 6/2010 | Jansen |
| 2013/0103202 A1* | 4/2013 | Bowyer ............... F03D 7/0292 700/275 |

FOREIGN PATENT DOCUMENTS

| | | |
|---|---|---|
| EP | 1 736 663 A2 | 12/2006 |
| JP | 2003-129935 A | 5/2003 |
| KR | 10-2010-0135058 A | 12/2010 |
| WO | WO 2009/030879 A1 | 3/2009 |

OTHER PUBLICATIONS

International Search Report and Written Opinion mailed Sep. 28, 2012 for Application No. PCT/US2012/030180.

International Preliminary Report on Patentability mailed Oct. 3, 2013 for Application No. PCT/US2012/030180.

Beyer et al., Wake effects in a linear wind farm. J Wind Eng Ind Aerodyn. May 1994; 51:303-18.

Do et al., Bluff Body Flow Separation Control Using Surface Dielectric Barrier Discharges. 45$^{th}$ AIAA Aerospace and Sciences Meeting and Exhibit. Reno, Nevada. Jan. 8-11, 2007. 9 pages.

Field et al., Entrainment of refrigerated air curtains down a wall. Exp Therm Fluid Sci. 2006;30:175-84.

Hansen et al., Power deficits due to wind turbine wakes at Horns Rev wind farm. Torque Conference. Jun. 28-30, 2010. 6 pages.

Ho et al., Vortex induction and mass entrainment in a small aspect ratio elliptical jet. J Fluid Mechanics. Jun. 1987;179:383-405.

Ivanell et al., Three dimensional actuator disco modeling of wind farm wake interaction. EWEC Brussels. Mar. 31-Apr. 3, 2008. 40 pages.

Johns Hopkins University, Better turbine spacing for large wind farms. Science Daily. Feb. 7, 2011. http://www.sciencedaily.com/releases/2011/01/110120111332.htm [last accessed Oct. 30, 2013]. 3 pages.

Kusiak et al., Design of wind farm layout for maximum wind energy capture. Renewable Energy. 2010;35:685-95.

Massouh et al., Exploration of the vortex wake behind of wind turbine rotor. J Phys Conf Ser. 2007;75:012036. doi:10.1088/1742-6596/75/1/012036. 9 pages.

Ricou et al., Measurements of entrainment by axisymmetrical turbulent jets. J Fluid Mechanics. Aug. 1961;11:21-32.

Sanderse, Aerodynamics of wind turbine wakes: literature review. ECN-E-09-016. Apr. 2009. 46 pages.

\* cited by examiner

SYSTEMS, DEVICES AND METHODS FOR IMPROVING EFFICIENCY OF WIND POWER GENERATION SYSTEMS

RELATED APPLICATIONS

This application is a national stage of International Patent Application Serial No. PCT/US2012/030180, filed Mar. 22, 2012, and entitled "Systems, Devices and Methods for Improving Efficiency of Wind Power Generation Systems," which claims priority under 35 U.S.C. §119(e) to U.S. Provisional Patent Application Ser. No. 61/466,442, filed Mar. 22, 2011, and entitled "Systems, Devices and Methods for Improving Efficiency of Wind Power Generation Systems," which are incorporated herein by reference in their entireties for all purposes.

FIELD OF THE INVENTION

The invention relates to systems, devices and methods for improving the efficiency of arrayed turbines, with particular emphasis on wind farm efficiency.

BACKGROUND OF INVENTION

Wind power generation is a renewal energy solution that involves the conversion of wind energy into electricity through the use of a turbine. Multiple wind turbines may be installed in large arrays to create wind farms that produce electrical power on a large scale. The power generation efficiency of wind farms is dependent on various factors, including, among others, efficiency of electrical components, wind speed and direction, individual turbine performance, and wake effects. Wake effects involve turbulent airflow and reduced wind velocity caused by upstream wind turbines that decrease the power output of downstream wind turbines in an array. Wake effects are particularly detrimental to the efficiency of a wind farm because wind power is proportional to the cube of wind velocity [1-6], and thus, relatively small decreases in wind velocity caused by upstream wind turbines, can result in relatively large decreases in power output of downstream turbines. Recent studies indicate that wind farms lose as much as 30%-35% of annual energy production (AEP) due to wake losses (as discussed by Beyer [1]). Wake losses have traditionally been addressed by maximizing the distance between turbines and/or by choice of array configuration. One study has shown that a distance of fifteen diameters or more [6] is needed for lower velocity wake to gain back velocity to near original wind speed. However, distances between turbines must be balanced with other factors that impact efficiency, such as additional electrical cable required when turbines are spaced further apart. There is continuing need for wind power generation systems with improved efficiency, and, in general for improvements in the efficiency and performance of arrayed batteries of turbines, whether for use in generating power from wind or other moving fluids or for use for other purposes, e.g. creating thrust.

SUMMARY OF THE INVENTION

Aspects of the invention relate to systems, devices and methods for improving the efficiency of arrayed turbines, with particular emphasis on wind farm efficiency. In some aspects of the invention, systems, devices and methods are provided for minimizing the extent to which the efficiency of arrayed turbines, for example wind farm efficiency, is limited by turbine wake effects. Systems, devices and methods are provided for increasing airflow velocity of successive turbines, for example in a wind farm, to decrease wake effects and improve the overall power output of the wind farm. Certain aspects of the invention address wind farm level efficiency by providing individual turbines having aerodynamically improved wake flow and velocity profiles.

According to some aspects of the invention, a turbine (e.g., a wind turbine) is provided that includes one or more turbine blades that are joined at a hub assembly; a rotor shaft attached to the hub assembly; one or more electrical generators coupled to the rotor shaft; a nacelle that houses one or more electrical generators; and one or more airflow components for inducing a secondary airflow that emanates from a rearward location on the wind turbine and that travels in a downstream direction relative to the wind direction. In some embodiments, the nacelle at least partially houses the turbine rotor shaft. In some embodiments, the nacelle houses the electrical generator, gearbox and shafts. In some embodiments, the nacelle houses a drive train that includes gearbox and shafts. In some embodiments, the one or more airflow components comprise a blower, an axial fan, a centrifugal fan, a ducted fan, a tangential fan, a bladeless fan, a variable pitch fan, a turbine, a diffuser, or a vortex generator. In some embodiments, the one or more airflow components comprise an annulus. In some embodiments, the annulus has an equal aspect ratio (e.g., circular geometry). In some embodiments, the annulus has an unequal aspect ratio (e.g., an elliptical geometry). In some embodiments, the one or more airflow components comprise guide vanes fixed within an annulus, in which the air stream exiting the annulus is a straight flow or a vortex flow. In some embodiments, the one or more airflow components are mounted on a rearward location on the nacelle of the wind turbine. In some embodiments, the turbine rotor is designed and configured for downwind operation, in which the one or more airflow components are mounted on a rearward location on the hub of the wind turbine.

In some embodiments, the wind turbine comprises a support structure. In some embodiments, the support structure comprises a tower. In some embodiments, the tower houses one or more first fluid channels that are designed and configured to permit the passage of a secondary airflow through the tower. In one embodiment, the nacelle houses one or more second fluid channels that are fluidically connected with the one or more first fluid channels housed in the tower and that are designed and constructed to permit the passage of secondary airflow from the one or more first fluid channels, through the nacelle and out of the nacelle at a rearward location on the wind turbine. In some embodiments, the nacelle houses one or more second fluid channels that are fluidically connected with one or more air inlet ports and that are designed and constructed to permit the passage of secondary airflow from the one or more air inlet ports, through the nacelle and out of the nacelle at a rearward location on the wind turbine. In some embodiments, the one or more second fluid channels comprise one or more heat transfer surfaces for transferring heat energy from the one or more electrical generators housed within the nacelle to a fluid medium passing within the one or more second fluid channels. In some embodiments, the one or more airflow components are designed and configured for inducing a secondary airflow that emanates from the rearward location on the wind turbine as a straight air flow. In some embodiments, the one or more airflow components are designed and configured for inducing a secondary airflow that emanates from the rearward location on the wind turbine as a vortex air flow. In some embodiments, one or more airflow components are attached at a rearward location on the nacelle. In some embodiments, one or more airflow components are attached to the rotor hub. In some embodiments, the wind turbine is designed and configured to operate as a downwind turbine that comprises one or more turbine blades, in which each blade comprises an upper portion designed and configured to convert wind energy to mechanical energy for rotating the turbine and a lower portion designed and configured to create a secondary air flow. In certain embodiments, the secondary airflow is a vortex flow. In some embodiments, the one or more airflow components are designed and configured for inducing a secondary airflow that has a velocity higher than the farfield velocity flow. In some embodiments, the wind turbine is a horizontal axis wind turbine.

According to some aspects of the invention, wind farms are provided that comprise a plurality of any of the foregoing wind turbines. For example, wind farms are provided that comprise one or more upstream wind turbines and one or more downstream wind turbines. In some embodiments, the one or more upstream wind turbines each comprise one or more airflow components for inducing a secondary airflow that emanates from a rearward location on the wind turbine and that travels in a downstream direction relative to the wind direction. In some embodiments, the one or more airflow components are designed and configured to induce secondary air flows that improve the downstream wake angle and velocity profile of wind for the one or more downstream turbines. In some embodiments, one or more sensors are mounted on at least each downstream wind turbine for sensing one or more parameters of incoming wind (e.g., speed, turbulence, temperature, etc.). In some embodiments, one or more control units are provided for receiving incoming wind data (e.g., wind speed data) from the one or more sensors and transmitting a corresponding control signal for adjusting the output of the one or more airflow components to maximize the downstream wind velocities for the one or more downstream wind turbines. According to other aspects of the invention, wind farms are provided that comprise one or more upstream wind turbines; one or more downstream wind turbines; one or more sensors mounted on at least each downstream wind turbine for sensing incoming wind speed; and one or more control units for receiving incoming wind speed data from the one or more sensors and transmitting a corresponding control signal for adjusting the pitch of one or more blades of the one of more upstream wind turbines to maximize the downstream wind velocities for the one or more downstream wind turbines. In some embodiments, methods and devices are provided for upgrading existing wind farms. In other embodiments, new turbines are provided that have blade designs that are de-tuned to achieve the same or similar effect with or without complementary control system and sensors.

According to some aspects of the invention, methods are provided for minimizing wake effects in a wind turbine. In some embodiments, the methods comprise inducing a secondary airflow that emanates from a rearward location on the wind turbine and that travels in a downstream direction relative to the wind direction. In some embodiments, the secondary airflow emanates from a rearward location on a nacelle of the wind turbine. In some embodiments, prior to emanating from the rearward location on the wind turbine, the secondary airflow passes through a tower supporting the wind turbine and at least a portion of a nacelle of the wind turbine. In some embodiments, the secondary airflow acquires heat energy from an electrical generator as it passes through the nacelle. In some embodiments, the secondary airflow emanating from the rearward location on the wind turbine is a straight air flow. In some embodiments, the secondary airflow emanating from the rearward location on the wind turbine is a vortex air flow.

In some embodiments, the secondary airflow is induced by a blower unit attached to a nacelle of the wind turbine. In some embodiments, the wind turbine is a downwind turbine that comprises one or more turbine blades, in which each blade comprises an upper portion designed and configured to convert wind energy to mechanical energy for rotating the turbine and a lower portion designed and configured to create a secondary air flow, in which the secondary airflow is a vortex flow. In some embodiments, the wind turbine is a downwind turbine that comprises one or more turbine blades, in which each turbine is coupled at one end to a turbine hub, in which the secondary airflow emanates from the turbine hub. In some embodiments, the secondary airflow passes through at least a portion of a nacelle of the wind turbine and emanates from a rearward location on the turbine hub. In some embodiments, the wind turbine is a horizontal axis wind turbine. In some embodiments, the secondary airflow acquires heat energy from an electrical generator as it passes through the nacelle. In some embodiments, the secondary airflow emanating from the rearward location on the turbine hub is a straight air flow. In some embodiments, the secondary airflow emanating from the rearward location on the turbine hub is a vortex air flow. In some embodiments, the secondary airflow is induced by a blower unit attached to a turbine hub. In some embodiments, the secondary airflow has a velocity higher than the farfield velocity flow.

According to some aspects of the invention, methods are provided for improving the efficiency of a wind farm that comprises one or more upstream wind turbines and one or more downstream wind turbines. In some embodiments, the methods involve inducing in each of the one or more upstream wind turbines, a secondary airflow that emanates from a rearward location of the wind turbine and that travels in a downstream direction relative to the wind direction. In some embodiments, the secondary air flows improve the downstream wake angle and velocity profile of the wind turbines. In some embodiments, the secondary air flows improve the downstream wake angle and velocity profile of the wind turbines. In some embodiments, the methods further involve de-tuning the one or more upstream wind turbines to obtain a higher downstream velocity for the one or more downstream turbines. In some embodiments, the one or more upstream wind turbines are de-tuned by adjusting the pitches of the blades of the one or more upstream wind turbines. In some embodiments, the blades are adjusted based on predetermined wake data. In some embodiments, the predetermined wake data comprises results from a computational fluid dynamics model. In some embodiments, the predetermined wake data comprises results from scale-model wind-tunnel experiments. In some embodiments, wake data is determined in real-time from one or more sensors on downstream turbines. In some embodiments, the method involves de-tuning the wind turbines in each row to maximize the wind velocities for the wind turbines in each downstream row. In some embodiments, the de-tuning is performed in real-time using a control feedback unit on each turbine.

DETAILED DESCRIPTION OF CERTAIN EMBODIMENTS OF THE INVENTION

In general, the invention relates to systems, devices and methods for improving the efficiency of arrays of turbines, such as wind turbines as relates to wind farm efficiency. In general, while the discussion below employs examples of wind farms and wind turbines for power generation, the invention may also be applied to other arrays of turbines configured for either power generation or thrust production, which may be configured for use with air or another gas or a liquid (collectively "fluids"). In general, it should be appreciated that systems, devices and methods described herein are not limited to wind turbine applications and may be relevant in other fluid driven power generation devices, including, for example, hydrokinetic turbines.

In some aspects, the power output of downstream wind turbines of a wind farm is improved in order to maximize total wind power output of the farm. Accordingly, aspects of the invention are useful for improving the annual energy production (AEP) of wind farms. In some aspects of the invention, systems, devices and methods are provided for minimizing the extent to which wind farm efficiency is limited by turbine wake effects. Systems, devices and methods are provided for increasing free stream velocity of successive turbines in a wind farm to decrease wake effects and improve the overall power output of the wind farm.

Figure 1:
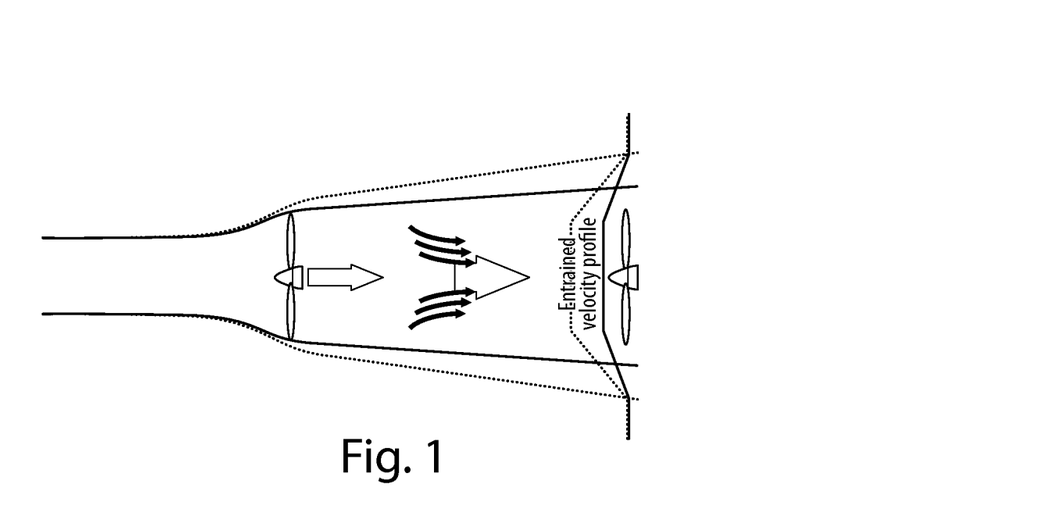
FIG. 1 provides a schematic of a non-limiting method for improving wind farm efficiency.
Figure 2:
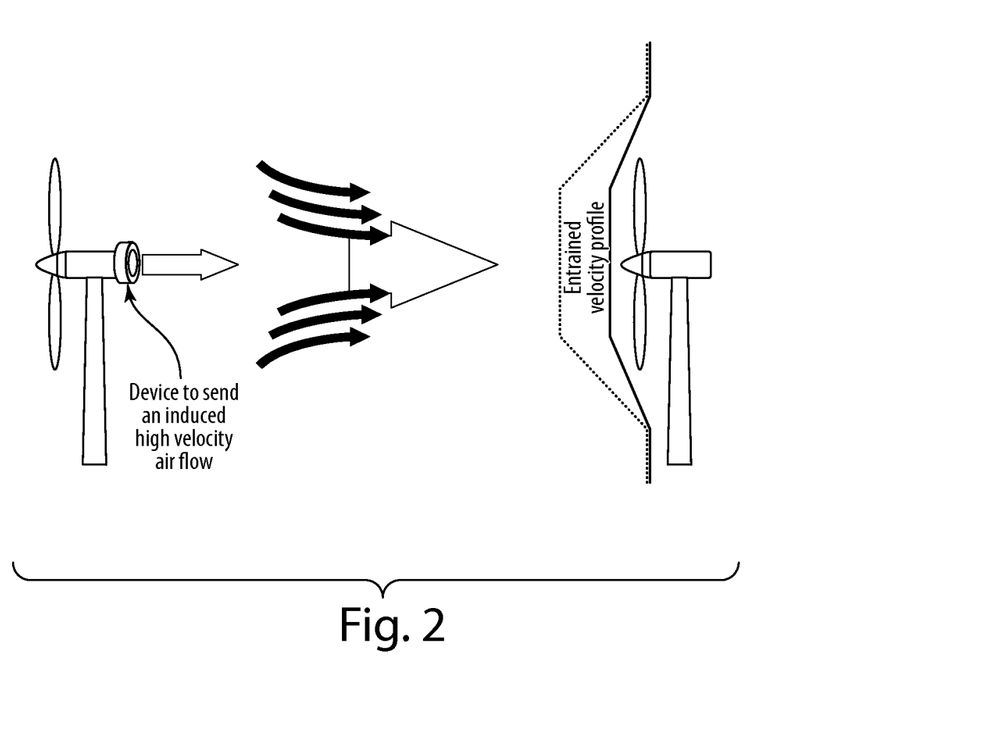
FIG. 2 provides a schematic of a non-limiting method for improving wind farm efficiency using a straight flow, as a secondary air flow.
Figure 3:
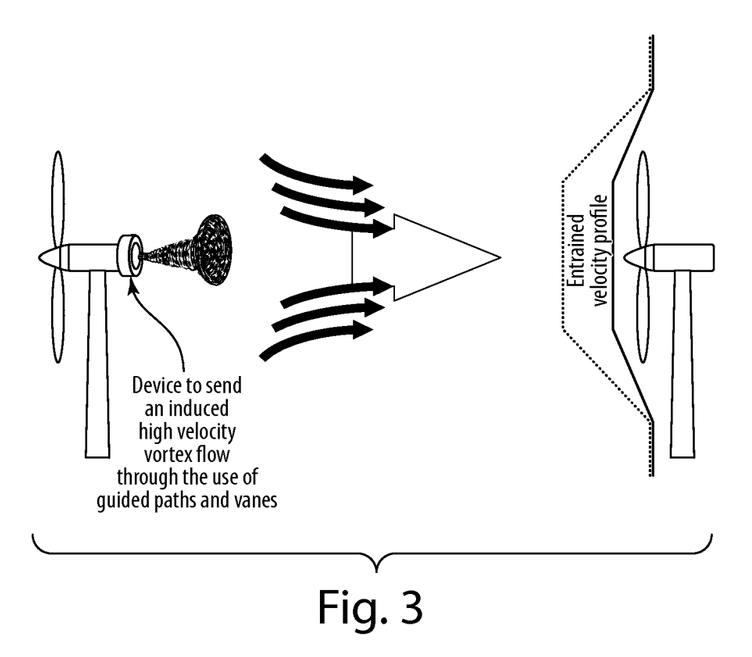
FIG. 3 provides a schematic of a non-limiting method for improving wind farm efficiency using a vortex flow, as a secondary air flow.

The invention, in some embodiments, addresses the wind farm level efficiency via aerodynamically modifying the wake flow and velocity profile of the turbine. This may be achieved by introducing a high velocity secondary flow to entrain air via fluid shear forces to reduce (or "pull-in") wake angle and simultaneously creating a more uniform flow velocity front (as depicted in FIG. 1). In some embodiments, wind turbine wakes are controlled (or tailored) via an accelerating air stream. The accelerated air stream may be induced (or created) using a device where air is drawn through a nacelle or tower and is directed towards the rotor outlet (as depicted in FIG. 2 and FIG. 3). The out-coming flow may be straight and have velocities higher than the farfield velocity flow. The out-coming flow may also be in the form of a vortex flow (as depicted in FIG. 3). Flow going through the nacelle can be used as cooling flow for the generator prior to exiting, in some embodiments. The accelerated stream may be induced by a rotor specifically shaped to induce a vortex flow aft of rotor or a standalone modular device attached on the rotor (See, e.g., FIG. 9). The rotor may be modified for the attachment of a standalone modular device (See, e.g., FIG. 8). This configuration is useful for downwind turbines due to tower clearance issues. A further advantage is the ability to obtain similar power out of a larger rotor with lower noise intensity. Noise intensity of a wind turbine is proportional to blade tip velocity (e.g., proportional by approximately the power of 5). In some embodiments, the modular device obtains a similar power output from a larger rotor with lower noise intensity. This is achieved, in some embodiments, by tailoring a portion of the blade for energy conversion and the remainder as a vortex generating aero profile.

Figure 5:
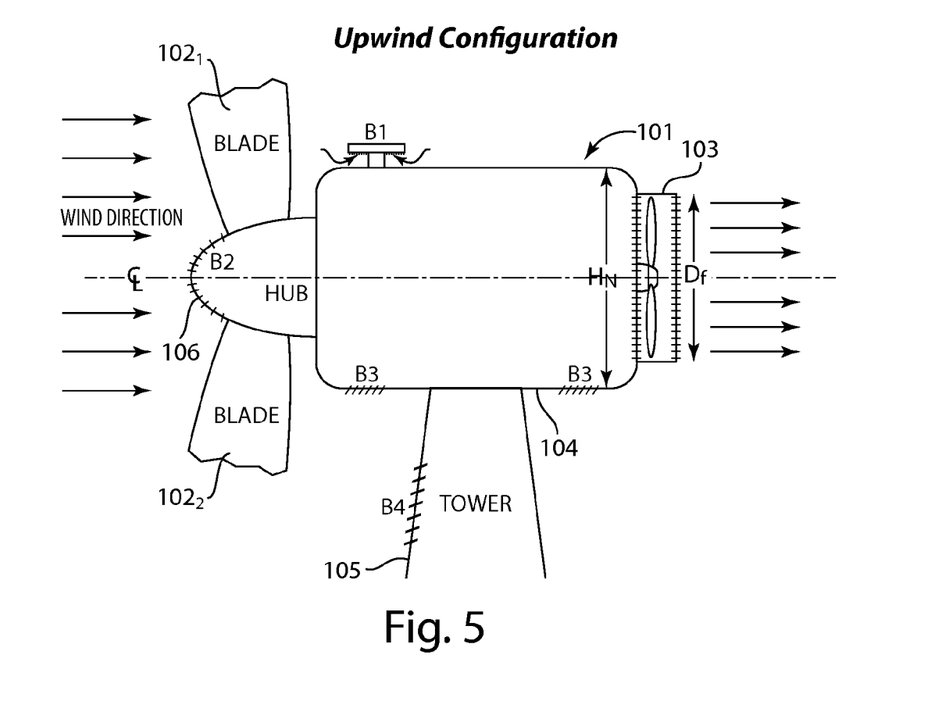
FIG. 5 provides a non-limiting example of an upwind wind turbine configuration.

FIG. 5 depicts an upwind configuration of a wind turbine 101. The configuration includes a nacelle 104 connected on top of a tower 105. The wind turbine 101 has one or more turbine blades $102_{1-2}$ that are joined at a hub assembly 106, and a nacelle 104 that at least partially houses a turbine rotor shaft and one or more electrical generators. The wind turbine 101 also includes one or more airflow components (e.g., external blower units) for inducing a secondary airflow that emanates from a rearward location on the wind turbine and that travels in a downstream direction relative to the wind direction. In particular, an external blower unit 103 is provided at the rear of the nacelle. Different types of external blower units 103 may be employed. For example, a straight fan unit may be provided that is directly or indirectly powered mechanically from a shaft of the wind turbine 101. In some embodiments, a gearbox may be provided between the shaft of the wind turbine 101 and the shaft of the external blower unit 103 to regulate speed of the external blower unit 103. In some embodiments, the external blower unit 103 is an electrically driven fan (e.g., powered from the grid or from electricity generated by the wind turbine itself). In some embodiments, the external blower unit 103 is or comprises a flow guide structure for blowing compressed air.

FIG. 5 depicts an external blower unit 103, which may, for example, be a modular fan system, having dimensions, $D_f$, less than the rotor diameter, $D_R$. In some embodiments, $D_f \lesssim \sim \frac{1}{3} D_R$. In some embodiments, $D_f$ being less than or equal to $\frac{1}{3} D_R$ prevents or minimize interference with rotor performance. In some embodiments, a rotor is tuned to perform under conditions where $D_f > \frac{1}{3} D_R$. The blower unit may be powered mechanically by connecting it to the shaft of the wind turbine 101 via a secondary gearbox or electrically driven by a motor powered from the grid or the wind turbine.

In FIG. 5, "B1-B4" show examples of suitable locations where air intake can take place for the external blower unit 103. It should be appreciated that the invention is not limited to these air intake locations and that other appropriate locations will be apparent to the skilled artisan. In some embodiments, air intake from the hub, "B2", (potentially with guide vanes) has a variety of advantages. For example, this configuration may limit water intake when raining; may provide more direct flow path and require less power to draw in air; and/or may avoid an aerodynamic stagnant point at hub. In some embodiments, "B1" is used, particularly if no opening is desired at the hub or nacelle 104 flooring. Additional shelter as shown may be used to prevent water intake. Another embodiment, "B3," is convenient for nacelle modification, installation and will generally not take in water. In some embodiments, as illustrated in "B4" air intake structure is designed to reduce aerodynamic "tower dam" effects.

Figure 6A:
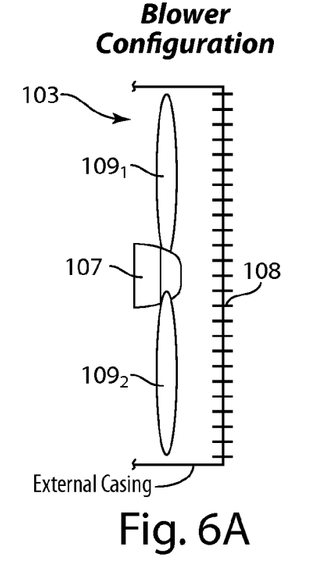
FIG. 6A-B provide non-limiting examples of different blower configurations.

FIG. 6 shows non-limiting examples of different blower configurations. The blower configuration depicted in FIG. 6A shows an external blower unit 103 that comprises a propeller having one or more blades $109_{1-2}$ connected to a hub assembly 107. In some embodiments, the external blower unit 103 may be powered mechanically or by an electric motor. The external blower unit 103 may be provided with an external casing that acts, at least in part, as a protective casing and provides guide vanes 108 to create, in some embodiments, cleaner straight flow streams. In some embodiments, the guide vanes 108 may be configured to create vortex flow. In some embodiments, speed of the external blower unit 103 that is regulated by an electric motor. In some embodiments, speed of the external blower unit 103 is regulated by the wind turbine itself (e.g., through a gearbox directly drawing torque from the turbine shaft).

Figure 6B:
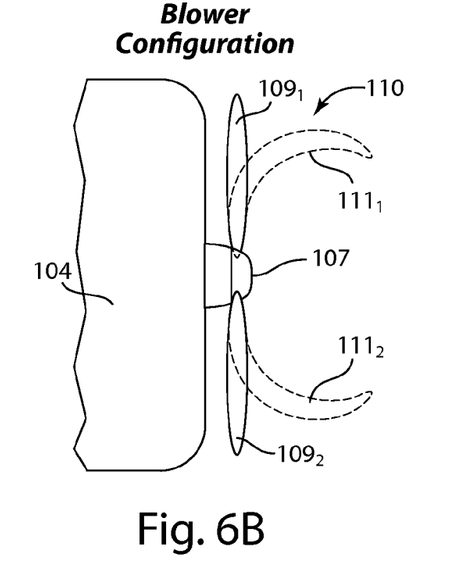

The configuration depicted in FIG. 6B provides a non-limiting example of an exposed external blower unit 110 (adjacent to a nacelle 104) that comprises a propeller having one or more blades $109_{1-2}$ connected to a hub assembly 107. An alternative configuration has out-of-rotational-plane propeller blades $111_{1-2}$ (e.g., in place of the one or more blades $109_{1-2}$) to induce air flow (e.g., a propeller shaped similar to the blades used in blenders) that has aerodynamic profiles customized for a strong air stream. The out-of-rotational-plane propeller blades $111_{1-2}$ may be configured to produce straight or vortex air flow.

Figure 7A:
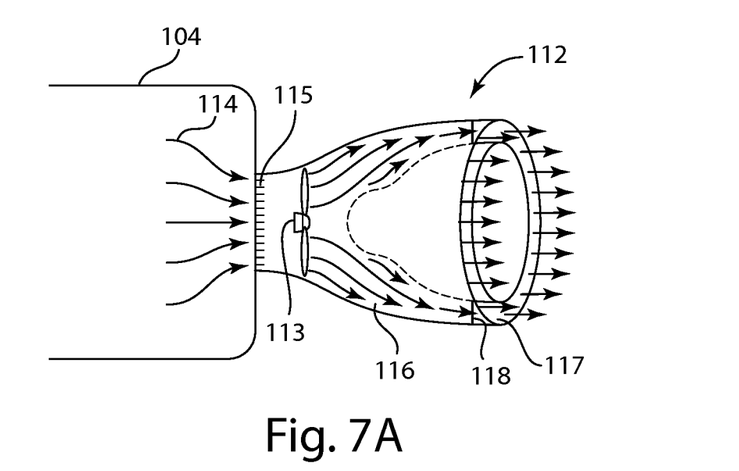
FIG. 7A-B provide non-limiting examples of different blower configurations.
Figure 7B:
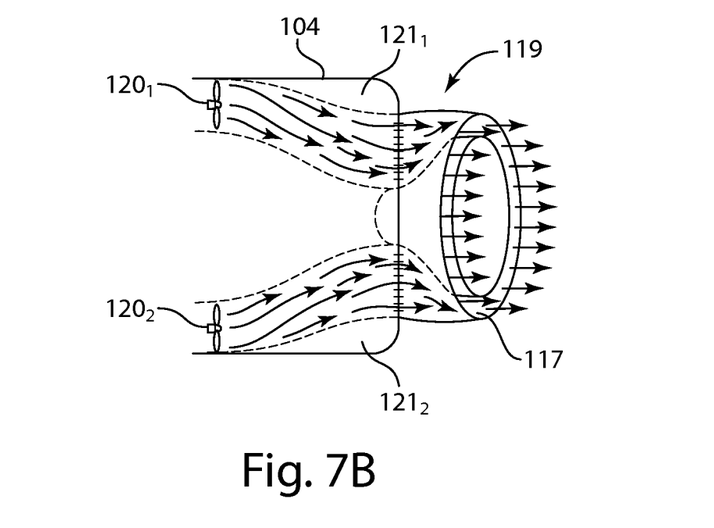

FIG. 7 shows further non-limiting examples of different blower configurations. The configuration in FIG. 7A depicts an external blower unit 112. In this external blower unit 112, the air stream exiting from the device is in the form of an annulus 117. Depending on the configuration of guide vanes 118 fixed within the annulus 117, the exiting air stream may be a straight flow or a vortex flow. The annulus 117 may have equal aspect ratio (circular geometry) or an unequal aspect ratio (an elliptical geometry). In some embodiments, a fan 113 is used to drive or accelerate incoming air 114 from within the nacelle 104 through the blower, as shown. The configuration in FIG. 7B shows a device 119 having ducted air pathways $121_{1-2}$ with two or more fans $120_{1-2}$. In some embodiments, this configuration is advantageous because it provides redundancy into the system to avoid complete system failure.

Figure 8A:
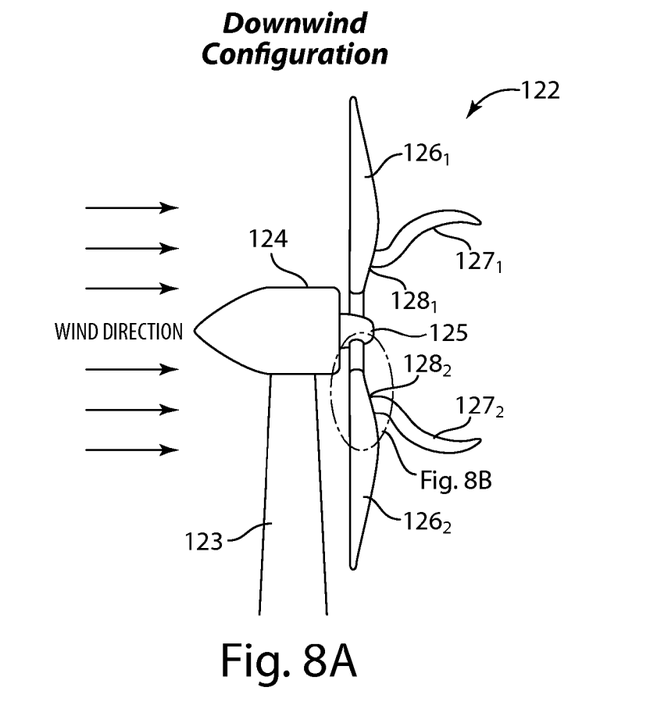
FIG. 8A-B provide a non-limiting example of a turbine design suitable for a downwind wind turbine.
Figure 8B:
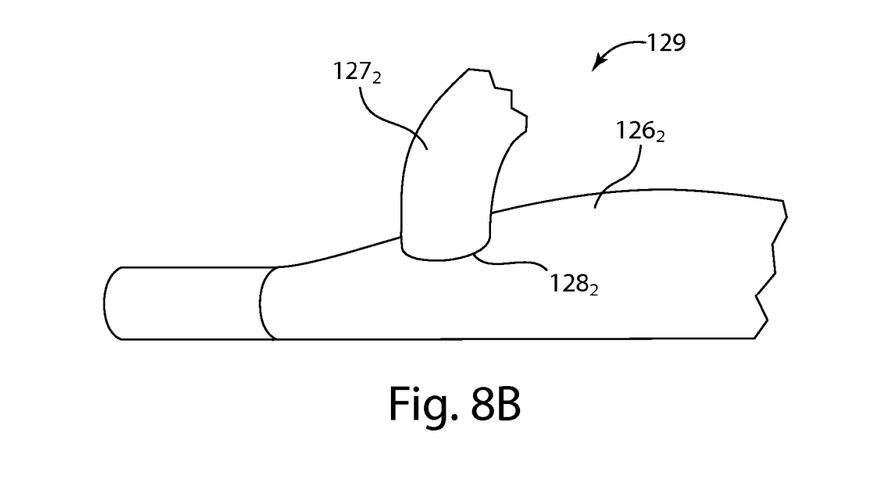

FIG. 8 depicts a non-limiting example of an airflow system 122 suitable for a downwind vertical axis wind turbine due to tower clearance requirements. The wind turbine has one or more turbine blades $126_{1-2}$ that are joined at a hub assembly 125, and a nacelle 124, which is connected on top of a tower 123, that at least partially houses a turbine rotor shaft and one or more electrical generators. The wind turbine also has one or more secondary blades $127_{1-2}$ connected at a connection point $128_{1-2}$ to the one or more turbine blades $126_{1-2}$. In some embodiments, this turbine design allows for upgrading existing wind turbines with this modular unit attached to the rotor. The secondary blades $127_{1-2}$ may be shaped for additional power generation and/or creating a vortex flow. In some embodiments, the upper half of the secondary blades $127_{1-2}$ provide power while the rest of the blade to the tip generates vortex flow. In this embodiment, the parasitic loss to the original wind turbine may be negligible or kept to a minimum. As depicted in FIG. 8B, in some embodiments, attachment of the secondary blades $127_{1-2}$ to the existing rotor blades $126_{1-2}$ may be done through the use of scarf joints and adhesives or bolted joints with reinforced metallic flanges. Such attachments and modifications may be located near the root for accessibility and structural robustness.

In some embodiments, the rotational speed in the device depicted FIG. 8 is passive, in that the blower spins at a rate determined by the rotation of the existing rotor. In some embodiments, the blower is directly coupled to the rotor and spins at the same rate as the existing rotor. In some embodiments, the blower is connected to the rotor through a gearing mechanism and rotates at a rate that may or may not be the same rate as the rotation of the existing rotor. In some embodiments, the tangential flow velocity of the vortex will be higher than the incoming flow velocity given by the relationship between relative velocity and tip speed ratio (TSR). In some embodiments, vortex flow speed is greater than incoming wind speed.

Figure 9A:
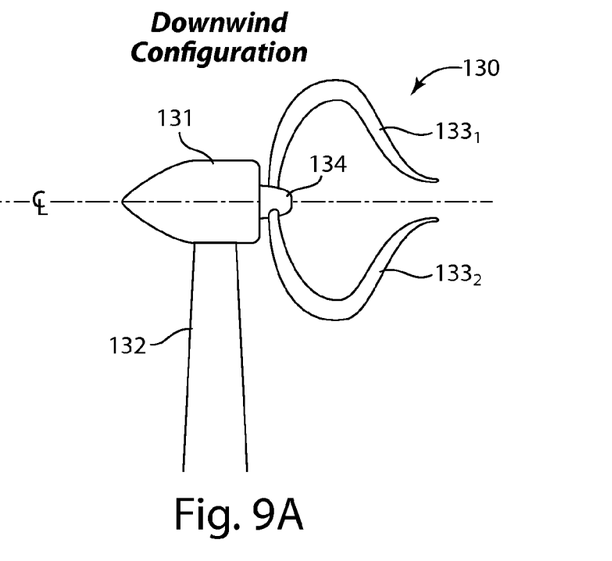
FIG. 9A depicts a non-limiting example of a turbine design having a separate blade that is attached on an original rotor.

FIG. 9 depicts non-limiting examples of downwind wind turbine configurations. FIG. 9A depicts a wind turbine 130 that has one or more turbine blades $133_{1-2}$ that are joined at a hub assembly 134, and a nacelle 131, which is connected to a tower 132, that at least partially houses a turbine rotor shaft and one or more electrical generators. In this configuration, a large portion distal to the tip of each turbine blade $133_{1-2}$ is used for power generation, and a smaller portion proximal to the tip (and including the tip) is used for creating vortex flow.

Figure 9B:
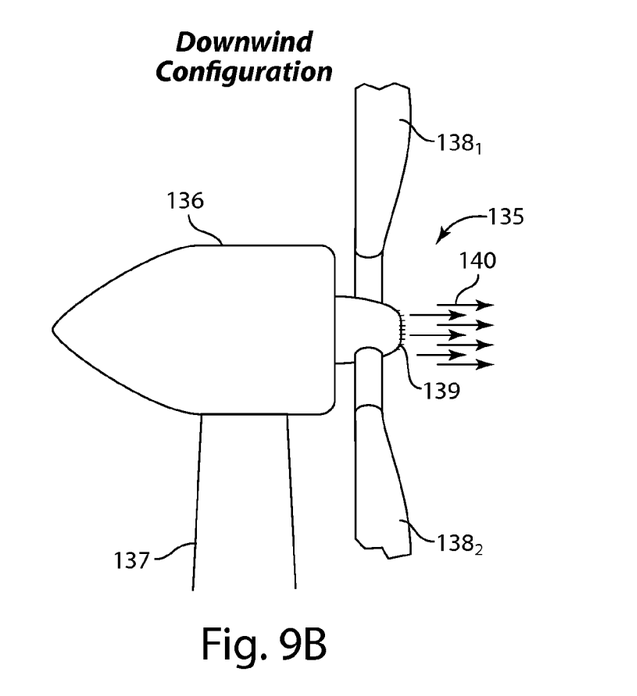
FIG. 9B depicts a non-limiting example of a turbine design for a downwind installation.

FIG. 9B illustrates a wind turbine 135 that has one or more turbine blades $138_{1-2}$ that are joined at a hub assembly 139, and a nacelle 136, which is connected to a tower 137, that at least partially houses a turbine rotor shaft and one or more electrical generators. In this configuration the hub assembly incorporates a blower unit with guided vanes installed in the hub cone, and air flow 140 produced by the blower unit may be a straight flow or vortex flow.

It should be appreciated that any of the blower configurations disclosed herein may be used in both upwind and downwind turbines. In some embodiments, the blower unit is attached to the nacelle in the upwind configuration and the hub in the downwind turbine configuration. However, other attachment configurations may be used.

In some embodiments, an Inter-Turbine Flow Control System (IT-Flows) rotor or device is provided that maximizes wind farms (e.g., offshore wind farms, onshore wind farms) and reduce cost of energy (COE) by recovering partially, or in full, the 30-35% loss in efficiency described in [1]. In some embodiments, a wind turbine is provided that has one or more blades that creates a low mass high velocity flow just behind the rotor. In another embodiment, a wind turbine is provided that has an secondary flow device that creates a low mass high velocity flow just behind the rotor. (See, e.g., FIG. 1)

In some embodiments, the low mass high velocity flow entrains the surrounding air over the distance between the upstream and downstream wind turbines. This entrained air changes the profile of the wake angle that occurs in the absence of the low mass high velocity flow. Analyses based on Bernoulli's theorem and mass continuity equations indicate that reduced wake increases the downstream air velocity before it reaches the next downstream turbine. Because power is directly proportional to the wind velocity cubed, significant power improvements are realized in downstream turbines, which thus maximizes the wind farm output.

Figure 4A:
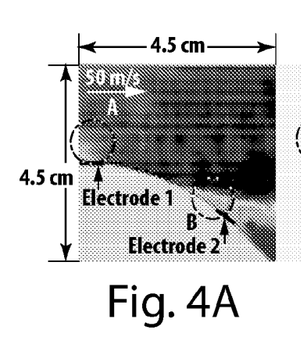
FIG. 4A-C provide a non-limiting example of results showing separation control by secondary flow through plasma actuation.
Figure 4B:
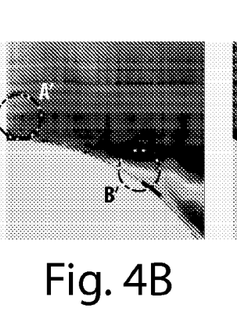
Figure 4C:
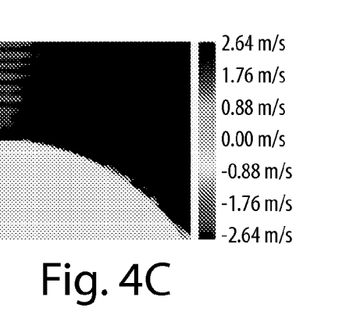
Figure 4D:
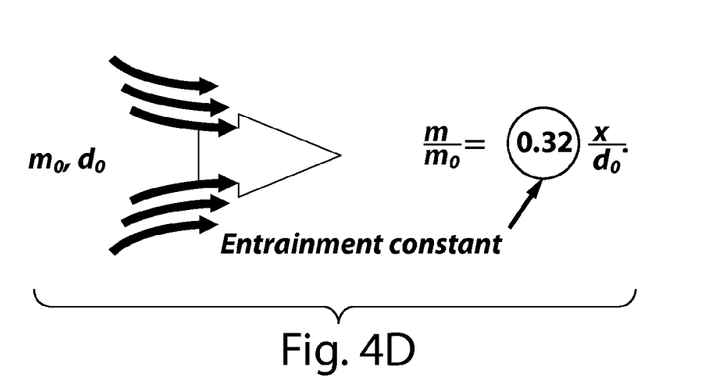
FIG. 4D provides a non-limiting example of an air entrainment mass flow relationship.

In some embodiments, entrained mass flow physics (see, e.g., Ricou [7]) (which, for example, have been utilized in the design of medical inhalers), predict an entrainment constant of 0.32 as shown in FIG. 4D. It has been discovered that the ratio of parasitic power loss (e.g., losses associated with creating secondary flows) to power gained in downstream wind turbines is approximately 9. Thus, for example, a 3 MW machine, sacrificing approximately 30 kW to create the secondary flow in a upstream turbine will gain approximately 0.27 MW of power output in the next downstream turbine. This improvement results in an approximate 10% overall AEP gain. This example is not intended to be limiting. Higher or lower efficiency gains can be achieved. In some embodiments, the entrainment analysis is based on entraining still air or zero velocity air. In other embodiments, the flow within and beyond the wake is moving, and thus, the entrainment analysis is based on entraining air having a non-zero velocity. In one embodiment, based on a straight flow within the wake, air velocity is one-third of the velocity of the wind beyond the wake. Entraining still air may take more energy than entraining already flowing air. Thus, in some embodiments, the entrainment constant for air that is moving is higher and thus more efficient than still air. Inter-turbine flow control may be improved further with entrainment modification based on vortex flow. Such improvements take into account the entrained airflow not being supplied from still air, as shown from the velocity profile in FIG. 1.

One skilled in the art of mechanics and aerodynamics will appreciate that secondary flows may be achieved in various ways. In some embodiments, an external device is employed to tailored or reduce the wake profile of a turbine for a more uniform and higher velocity flow field. In some embodiments, an upstream turbine is de-tuned to obtain a higher downstream velocity for the next turbine in-line so as to maximize the overall performance of the wind farm. This approach may involve the use of pre-determined wake data for each subsequent row of turbines. Alternatively, controlled feedback from each turbine is employed to determine the proper blade pitch control to de-tune individual turbines for higher farm performance.

REFERENCES

1. H. G. Beyer, T. Pahlke, W. Schmidt et al., "Wake effects in a linear wind farm", J. Wind Eng. Ind. Aerodyn, vol. 51, 1994, pp. 303-318.
2. F. Massouh and I. Dobrev, "Exploration of the vortex behind of wind turbine rotor". 2007 J. Phys.: Conf. Ser. 75
3. B. Sanderse, "Aerodynamics of wind turbine wakes: literature review", ECN-E-09-016.
4. K. S. Hansen, R. Barthelmie et al., "Power deficits due to wind turbine wakes at Horns Rev wind farm",
5. S. Ivanell, R. Mikkelsen, J. N. Sorensen and D. Henningson, "Three dimensional actuator disc modeling of wind farm wake interaction", EWEC 2008 Brussels
6. C. Meneveau, "Better turbine spacing for large wind farms", Science Daily, 7 Feb. 2011.
7. F. P. Ricou and D. B. Spalding, "Measurements of entrainment by axisymmetrical turbulent jets", Journal of Fluid Mechanics, November 1960
8. H. Do, W. Kim et al, "Bluff body flow separation control using surface dielectric barrier discharges", 45th AIAA Aerospace and Sciences, 2007-939
9. C. M. Ho and E. Gutmark, "Vortex induction and mass entrainment in a small aspect ratio elliptical jet", Journal of Fluid Mechanics (1987), 179: 383-405

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only and the invention is described in detail by the claims that follow. All references cited herein are incorporated by reference in their entireties for all purposes.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A wind turbine comprising:
   one or more turbine blades that are joined at a hub assembly;
   a rotor shaft attached to the hub assembly;
   one or more electrical generators coupled to the rotor shaft;
   a nacelle that at least partially houses the rotor shaft and one or more electrical generators; and
   one or more airflow components positioned externally of the nacelle for inducing a secondary airflow that emanates from a rearward location on the wind turbine and that travels in a downstream direction relative to the wind direction.

2. The wind turbine of claim 1, wherein the one or more airflow components are mounted on a rearward location on the nacelle of the wind turbine.

3. The wind turbine of claim 1, wherein the rotor shaft is designed and configured for downwind operation and wherein the one or more airflow components are mounted on a rearward location on the hub assembly of the wind turbine.

4. The wind turbine of claim 1, wherein the wind turbine is designed and configured to operate as a downwind turbine, and wherein the wind turbine further comprises one or more out-of-rotational-plane blades attached to the rotor shaft or hub assembly.

5. The wind turbine of claim 1, wherein the one or more airflow components are designed and configured for inducing a secondary airflow that has a velocity higher than the farfield velocity flow.

6. A method for minimizing wake effects in the wind turbine of claim 1, the method comprising inducing a secondary airflow that emanates from a rearward location on the wind turbine and that travels in a downstream direction relative to the wind direction.

7. A method for minimizing wake effects in the turbine of claim 1, the method comprising inducing a secondary fluid flow that emanates from a rearward location on the turbine and that travels in a downstream direction relative to the fluid flow direction.

8. The wind turbine of claim 1, wherein the one or more airflow components comprise a fan, a turbine, a diffuser, or a vortex generator.

9. The wind turbine of claim 8, wherein the fan is an axial fan, a centrifugal fan, a ducted fan, a tangential fan, a bladeless fan, blower fan, or a variable pitch fan.

10. A wind farm comprising a plurality of the wind turbines of claim 1.

11. The wind farm of claim 10, wherein the one or more airflow components are designed and configured to induce secondary air flows that improve the downstream wake angle and velocity profile of wind for the one or more downstream turbines.

12. A wind farm comprising:
   one or more upstream wind turbines and
   one or more downstream wind turbines,
   wherein the one or more upstream wind turbines each comprise one or more airflow components for inducing a secondary airflow that emanates from a rearward location on the wind turbine and that travels in a downstream direction relative to the wind direction;
   one or more sensors mounted on the one or more downstream wind turbines for sensing incoming wind speed; and
   one or more control units for receiving incoming wind speed data from the one or more sensors and transmitting a corresponding signal to control the one or more airflow components.

13. The wind farm of claim 12, further comprising:
one or more sensors mounted on at least each downstream wind turbine for sensing incoming wind speed,
wherein the one or more upstream wind turbines each comprise one or more airflow components positioned externally of the nacelle for inducing a secondary airflow that emanates from a rearward location on the wind turbine and that travels in a downstream direction relative to the wind direction.

14. The wind farm of claim 12, further comprising:
one or more sensors mounted on at least each downstream wind turbine for sensing incoming wind speed; and
one or more control units for receiving incoming wind speed data from the one or more sensors and transmitting a corresponding control signal for adjusting the pitch of one or more blades of the one of more upstream wind turbines to maximize the downstream wind velocities for the one or more downstream wind turbines.

15. A method for improving the efficiency of the wind farm of claim 12, the method comprising, inducing in each of the one or more upstream wind turbines, a secondary airflow that emanates from a rearward location of the wind turbine and that travels in a downstream direction relative to the wind direction.

16. A turbine system comprising
one or more turbine blades that are joined at a hub assembly;
a rotor shaft attached to the hub assembly;
a nacelle that at least partially houses the turbine rotor shaft; and
one or more working fluid flow components positioned externally of the nacelle for inducing a secondary fluid flow that emanates from a rearward location on the turbine and that travels in a downstream direction relative to the fluid flow direction.

17. An array of turbines comprising the turbine system of claim 16, the array comprising:
one or more upstream turbines and
one or more downstream turbines,
wherein the one or more upstream turbines each comprise one or more fluid flow components positioned externally of the nacelle for inducing a secondary fluid flow that emanates from a rearward location on the turbine and that travels in a downstream direction relative to the fluid flow direction.

18. The array of turbines of claim 17, further comprising:
one or more sensors mounted on at least each downstream turbine for sensing incoming fluid speed,
wherein the one or more upstream turbines each comprise one or more fluid flow components positioned externally of the nacelle for inducing a secondary fluid flow that emanates from a rearward location on the turbine and that travels in a downstream direction relative to the fluid flow direction.

19. The array of turbines of claim 17, further comprising
one or more sensors mounted on at least each downstream turbine for sensing incoming fluid speed; and
one or more control units for receiving incoming fluid speed data from the one or more sensors and transmitting a corresponding control signal for adjusting the pitch of one or more blades of the one of more upstream turbines to maximize the downstream fluid velocities for the one or more downstream turbines.

20. A method for improving the efficiency of the array of turbines of claim 17, the method comprising, inducing in each of the one or more upstream turbines, a secondary airflow that emanates from a rearward location of the turbine and that travels in a downstream direction relative to the fluid flow direction; or de-tuning the one or more upstream turbines to obtain a higher downstream velocity for the one or more downstream turbines; or de-tuning the turbines in each row to maximize the wind velocities for the turbines in each downstream row.

* * * * *